United States Patent [19]

Kasugai et al.

[11] Patent Number: 4,540,103
[45] Date of Patent: Sep. 10, 1985

[54] CAP WITH A VALVE UNIT

[75] Inventors: Joji Kasugai, Ichinomiya; Akihiro Nakagami, Nishikasugai, both of Japan

[73] Assignee: Toyoda Gosei Co., Ltd., Nishikasugai, Japan

[21] Appl. No.: 675,703

[22] Filed: Nov. 28, 1984

[30] Foreign Application Priority Data

Nov. 29, 1983 [JP] Japan ................................. 58-224628

[51] Int. Cl.³ ............................................. B65D 51/16
[52] U.S. Cl. .................................... 220/203; 220/303; 220/DIG. 32
[58] Field of Search ............... 220/203, 303, 360, 361, 220/367, 369, DIG. 32, DIG. 33

[56] References Cited

U.S. PATENT DOCUMENTS 4,079,855  3/1978  Avrea ................................. 220/203
4,498,599  2/1985  Avrea ............................. 220/303 X

FOREIGN PATENT DOCUMENTS 1237176  6/1971  United Kingdom ................ 220/203

Primary Examiner—Steven M. Pollard
Attorney, Agent, or Firm—Cushman, Darby & Cushman

[57] ABSTRACT

A cap is provided with a valve adapted to release negative pressure in the interior of a storage tank. Upon assembly of this negative pressure release valve, while a coil spring bears against the underside of a retainer plate, the retainer plate with a valve body fixedly mounted thereon is first assembled temporarily in a spring retainer plate upon which legs are in engagement with a hole. With this arrangement, a valve unit is formed. Next, the valve unit is positioned at the central portion of a body portion and the peripheral edge portion of the spring retainer plate is fitted in a retainer section of the body portion so as to disengage the legs from the hole in the spring retainer plate. In this state, the valve body retained on the retainer plate is pressed against the underside of a valve hole by the coil spring and thus, is regularly positioned.

3 Claims, 5 Drawing Figures

CAP WITH A VALVE UNIT

BACKGROUND OF THE INVENTION

1. Field of the Invention

The present invention relates to a cap with a valve unit attached thereto which may be used as a fuel cap for use in an automotive vehicle or the like, and more particularly to a cap with a valve unit of the type which releases negative pressure in a fuel storage tank.

2. Description of the Prior Art

A fuel cap for use in an automotive vehicle is generally provided with a valve adapted to release negative pressure in a fuel storage tank. Heretofore, this kind of fuel cap with a negative pressure release valve includes a hollow body portion 1 which is threadably secured to a fuel injection hole 7 and a valve body 2 disposed against a valve hole 6 formed at the upper portion of the valve body 1 as shown in FIG. 1. In this fuel cap, the valve body 2 of relatively large size, a retainer plate 3 adapted to retain the valve body 2 thereon, a coil spring 4 adapted to urge the valve body 2 in such a direction that the valve body 2 is closed, and a spring retainer plate 5 are all incorporated in the body portion 1. It is requested, therefore, that a valve unit including the valve body 2 and the coil spring 4 be formed into a smaller size. There has been developed a fuel cap with a smaller valve unit.

However, while the dimensions of a valve unit are reduced, operability in the couse of assembly will deteriorate on the ground that a comparatively small valve body and a retainer plate need be properly positioned in the cap one after the other, Furthermore, such valve body and coil spring may be assembled in an improper position.

SUMMARY OF THE INVENTION

The present invention has been made to solve the foregoing problems, and has for its purpose to provide a cap with a valve unit which improves operability in the course of assembly and eliminates improper positioning of components to be assembly by assembling a valve unit in a unitary state prior to fitting the same into a cap.

In order to achieve the foregoing objects, in a cap with a valve unit wherein a valve body retained in a retainer plate is forcibly fitted into a valve hole formed in a hollow body portion by means of a coil spring, a cap with a valve unit according to the present invention comprises a plurality of resilient legs projecting from the underside of the retainer on which the valve body is fixedly mounted and including respective projections projecting outwardly therefrom, a hole formed in a spring retainer plate adapted to retain the coil spring in cooperation with the retainer plate and engageable with the legs, and a retainer section provided in the body portion so as to engage with the edge of the spring retainer plate.

In a cap with a valve unit according to the present invention, a valve body, retainer plate, coil spring and the like are assembled together so as to constitute a valve unit in the course of assembly. This valve unit is then fitted into a body portion of the cap and at the same time, the valve body and other related components are regularly positioned under rearrangement of the valve unit. Hence, assembly may readily and effectively be carried out. In addition, the valve body and other related components may be properly positioned so that high quality may be maintained as compared with a conventional cap assembly wherein each component is assembled in a nallow interior thereof one after the other.

DESCRIPTION OF THE PREFERRED EMBODIMENTS

Figure 1:
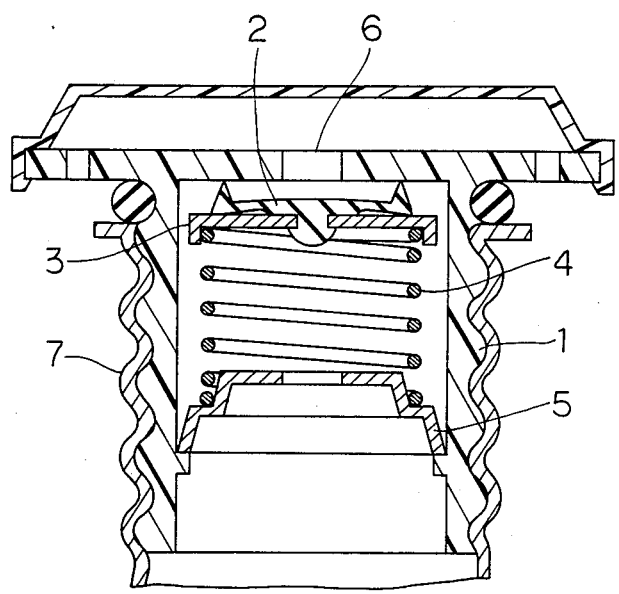
FIG. 1 is a sectional elevational view of a conventional cap with a valve unit.
Figure 2:
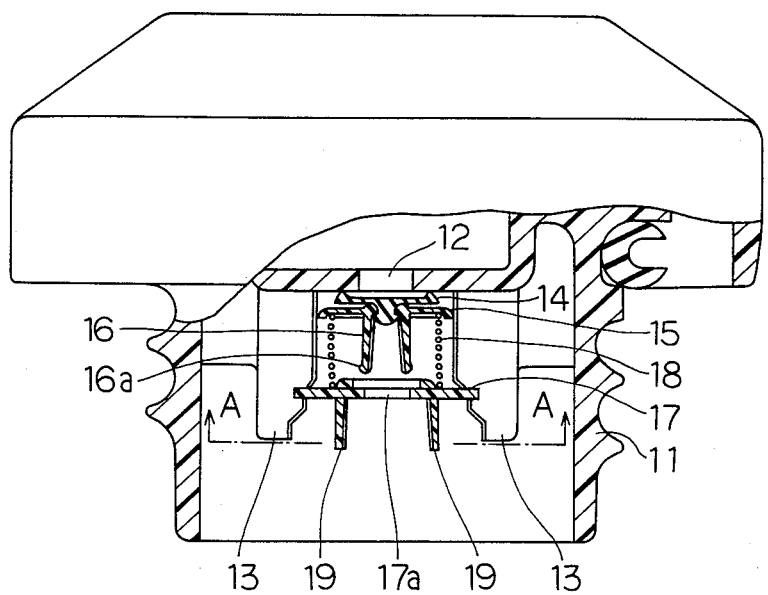
FIG. 2 is a elevational, partly sectioned, view of a cap with a valve unit according to one embodiment of the present invention.
Figure 3:
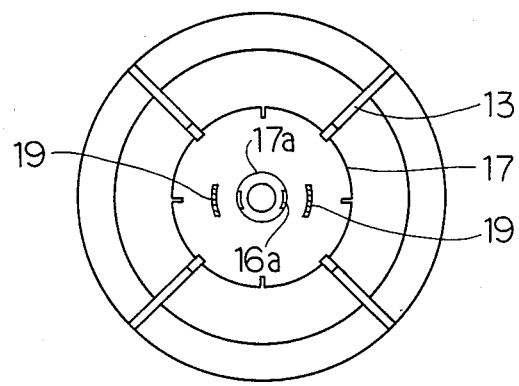
FIG. 3 is a view substantially taken along the line A—A in FIG. 2.

FIG. 2 is a elevational, partly sectioned, view of a cap with a valve unit, FIG. 3 is a view substantially taken along the line A—A in FIG. 2. A body portion 11 in a cap with a valve unit is a hollow cylindrical configuration and includes an outer wall which is threaded outwardly. Further, provided at the upper portion in the interior of the body portion 11 is a valve hole 12 in the form of a projection. Reference numeral 13 designates a retainer section constructed of ribs provided radially in the body portion 11 leaving a space at the central portion thereof and formed with respective recesses 13a into which the edge of a spring retainer plate 17 in the valve unit as will hereinafter be described is fitted. Reference numeral 14 designates a disk-shaped valve body. Reference numeral 15 designates a retainer plate on which the valve body 14 is fixedly mounted. The underside of the retainer plate 15 includes a raised peripheral edge portion by which a coil spring 18 is retained and two resilient legs 16. Formed outwardly form the front end of each of the lags is a projection 16a for engagement with a spring retainer plate 17 as will hereinafter be described. The spring retainer plate 17 has the form of a disk, slightly larger than the retainer plate 15. Centrally formed in the spring retainer plate 17 is a hole 17a into which two legs 16 of the retainer plate 15 are inserted for engagement therewith. An annular projection 17a is formed around the hole 17a on the upper surface of the spring retainer plate 17 so as to retain and centrally position the end of the coil spring 18 thereon. Also, two gripping pieces 19 projecting from the underside of the spring retainer plate 17 are to be gripped when the valve unit is fitted in the body portion 11. A plurality of slits are formed at the peripheral edge of the spring retainer plate 17 so that the spring retainer plate 17 may readily be bent upon fitting thereof into the body portion 11. It will be appreciated that upon engagement of the two legs with the hole 17a of the spring retainer plate 17, the retainer plate 15 is connected with the spring retainer plate 17 via the projections 16a of the opposite legs 16.

Figure 4:
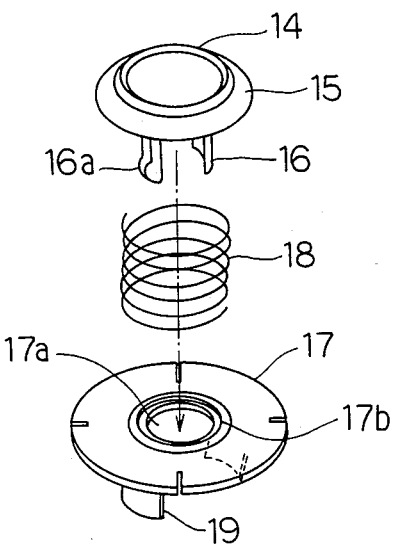
FIG. 4 is an exploded perspective view of the valve unit.
Figure 5:
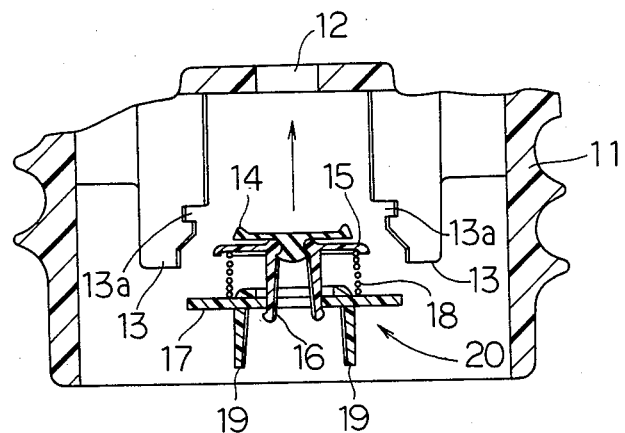
FIG. 5 is a sectional view showing the manner in which the valve unit is assembled in the cap.

The cap with the valve unit thus constructed will be assembled as follows:

As shown in FIG. 4, while the coil spring 18 bears against the underside of the retainer plate 15, the retainer plate 15 with the valve body 14 fixedly mounted thereon is first assembled temporarily in the spring retainer plate 17 upon which the legs 16 are in engagement with the hole 17a. With this arrangement, the valve unit 20 is formed and all the components therein are properly positioned.

Next, the valve unit 20 is centrally positioned in the interior of the body portion 11 while the gripping pieces 19 are gripped by the fingers of an assembly worker. In this state, the peripheral edge portion of the spring retainer plate 17 is further fitted in the recesses 13a of the retainer section 13 by the force of a predetermined jig.

At this time, the legs 16 are pressed in such a direction that they are disengaged from the hole 17a. Thus, the valve body 14 fixedly mounted on the retainer plate 15 is pressed against the underside of the valve hole 12 by the force of the coil spring 18 whereby the valve body 14 and the retainer plate 15 are assembled in their regular position.

What is claimed is:

1. In a cap with a valve unit wherein a valve body retained in a retainer plate is forcibly fitted into a valve hole formed in a hollow body portion by means of a coil spring, the improvement comprising: a plurality of resilient legs projecting from the underside of the retainer plate on which said valve body is retained and including respective projections projecting outwardly therefrom, a hole formed in a spring retainer plate adapted to retain the coil spring in cooperation with the retainer plate and engageable with the legs and a retainer section provided in the body portion so as to engage with the edge of the spring retainer plate.

2. A cap with a valve unit according to claim 1, wherein gripping pieces project from the underside of the spring retainer plate.

3. A cap with a valve unit according to claim 1, wherein an annular projection is formed around the hole on the spring retainer plate so as to retain and centrally position the coil spring thereon and said retainer section is constructed of ribs provided radially in the body portion leaving a space at the central portion thereof, said ribs being formed with respective recesses into which the peripheral edge portion of the spring retainer plate is fitted.

* * * * *